UNITED STATES PATENT OFFICE.

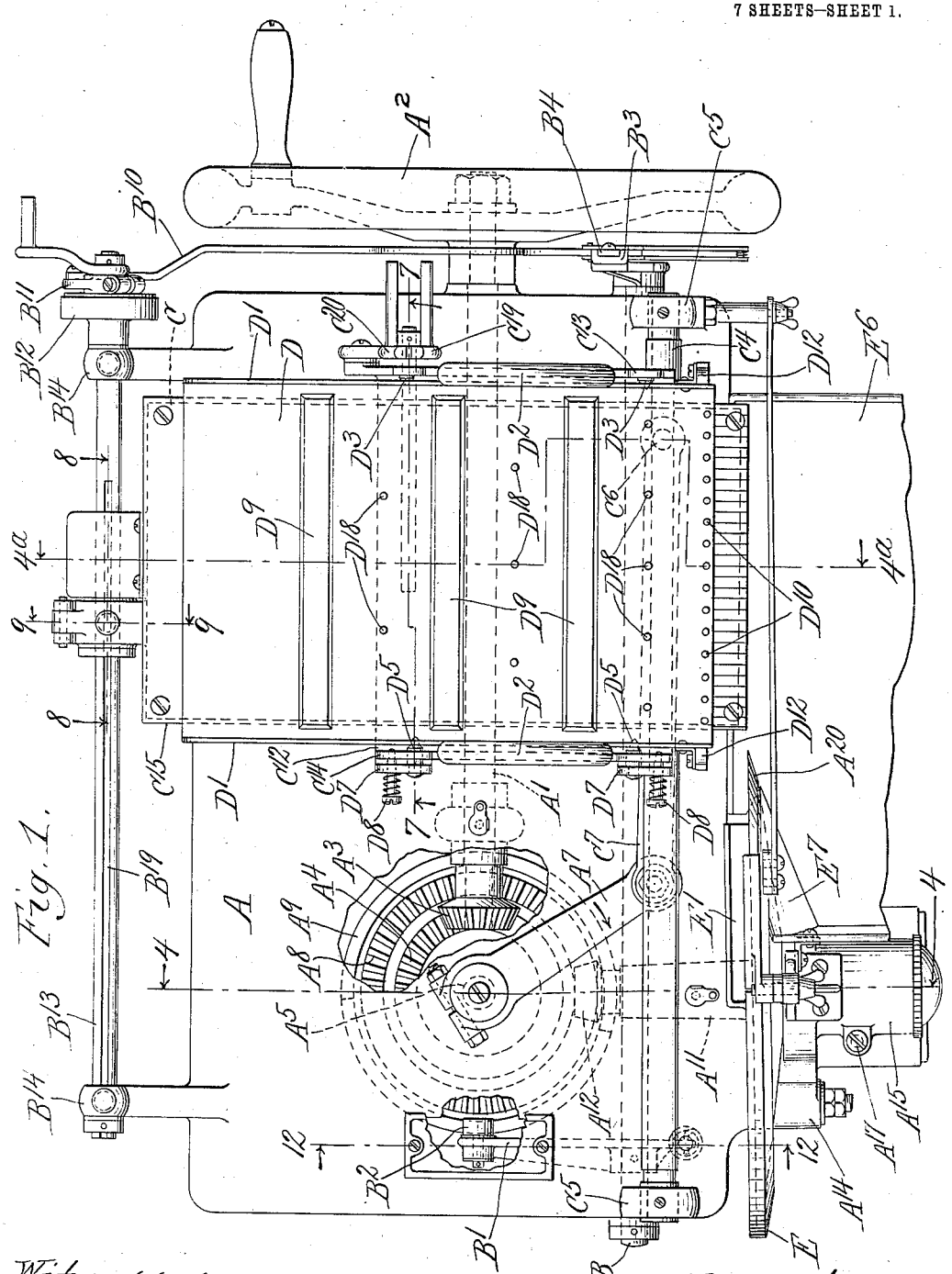

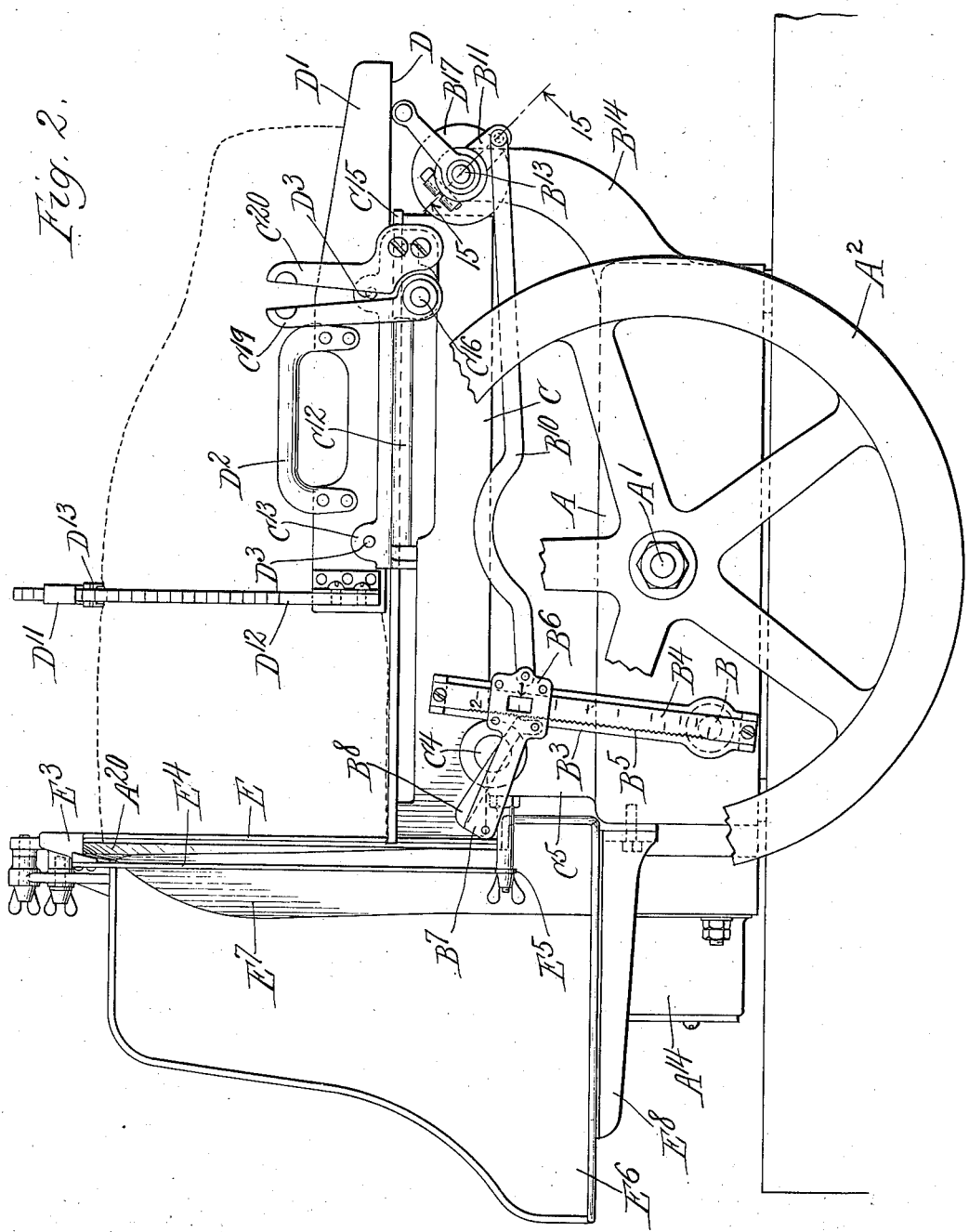

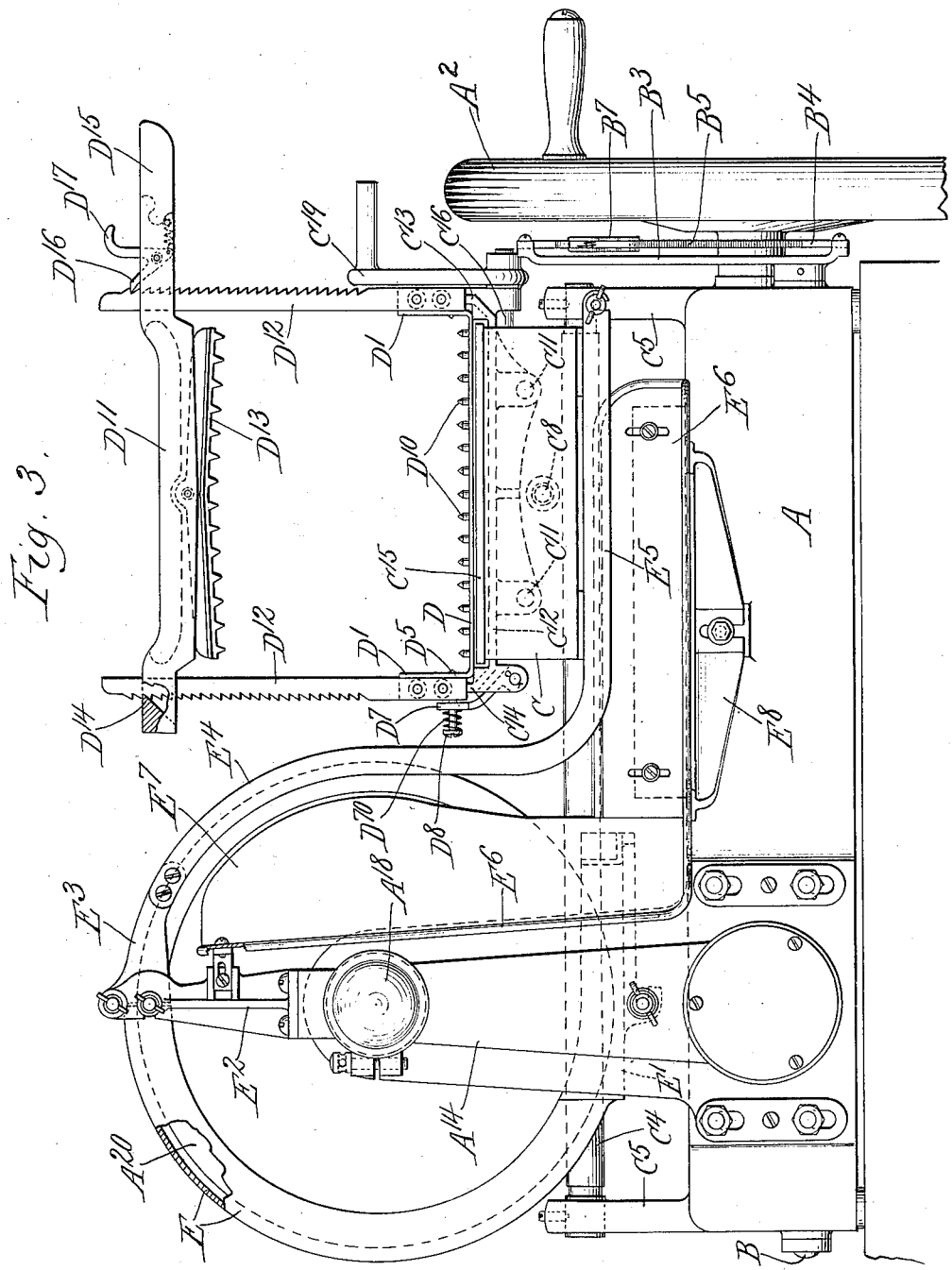

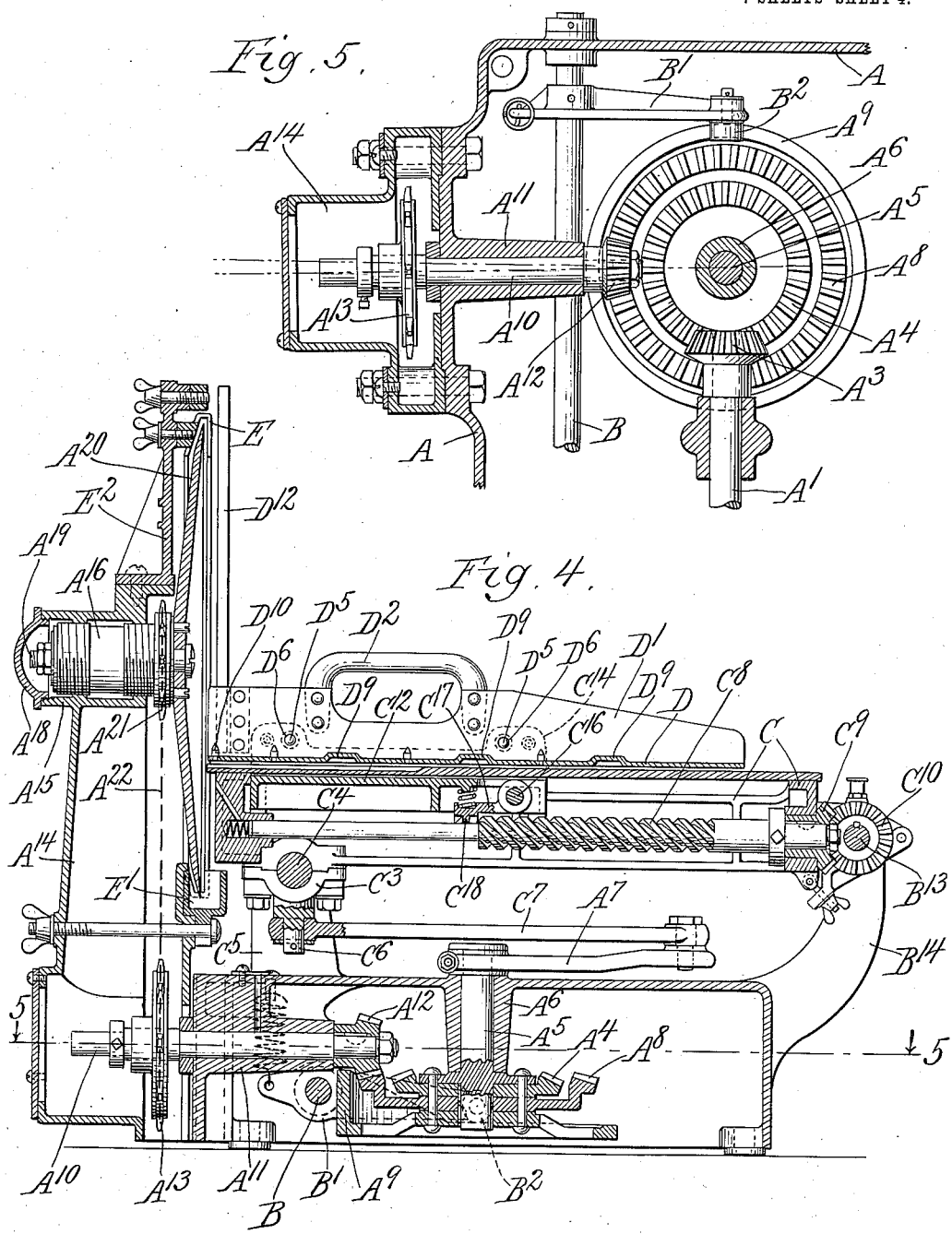

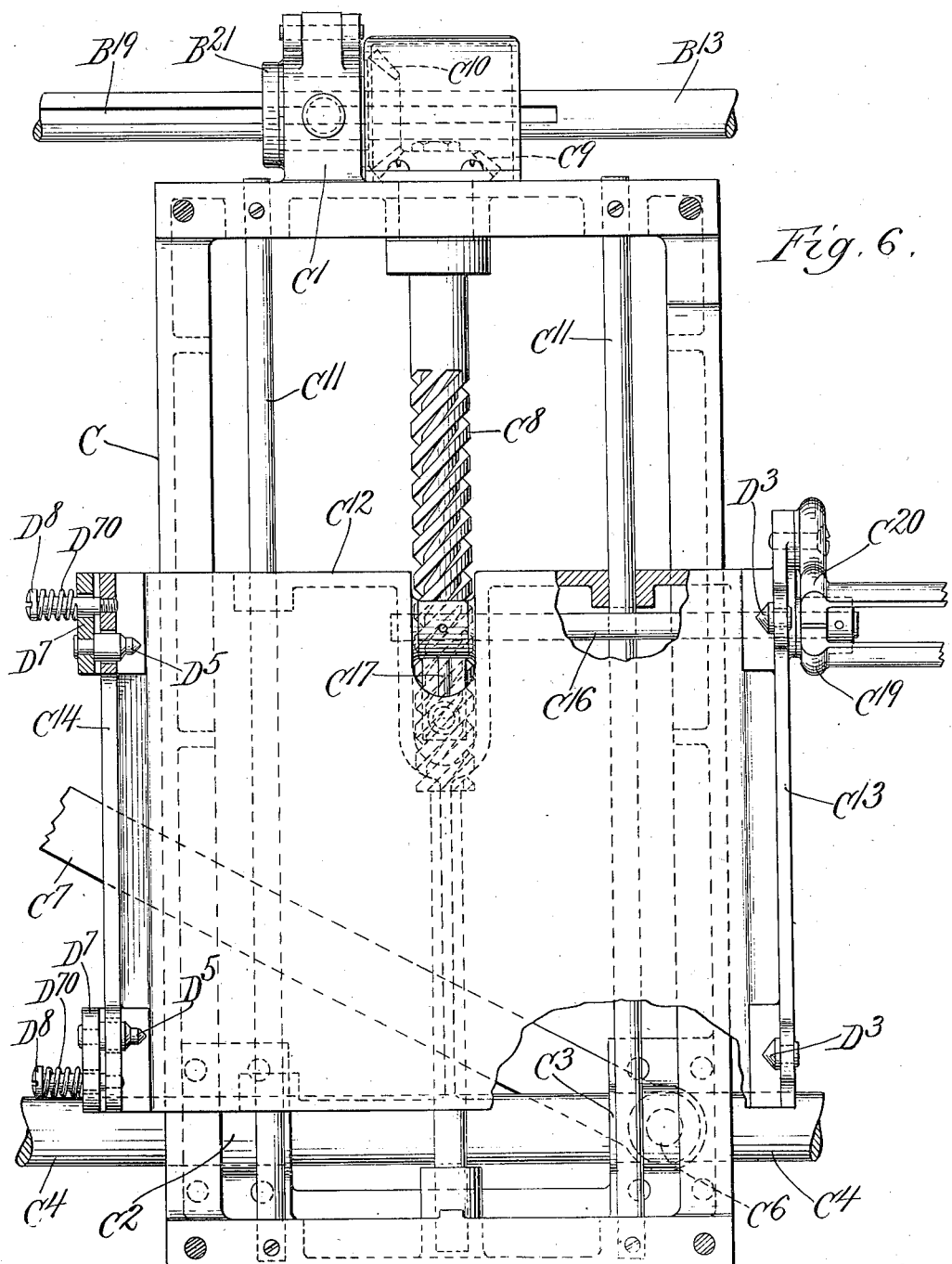

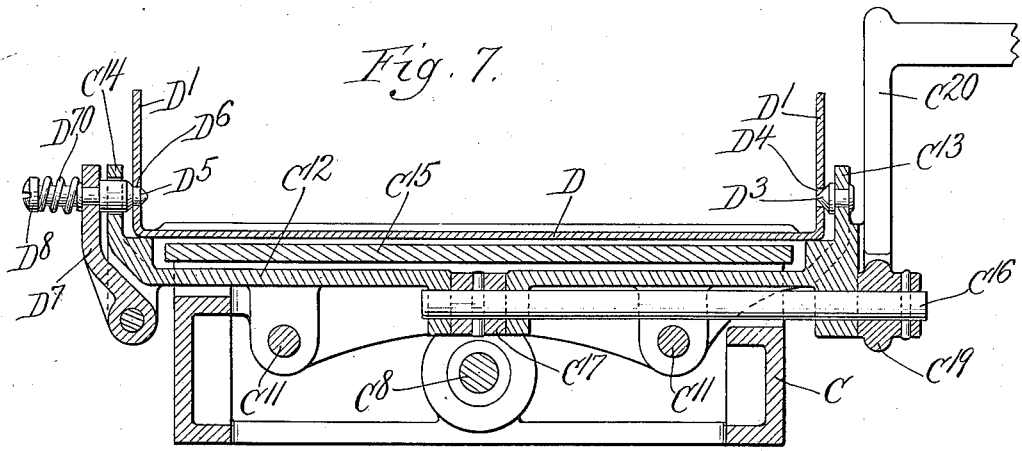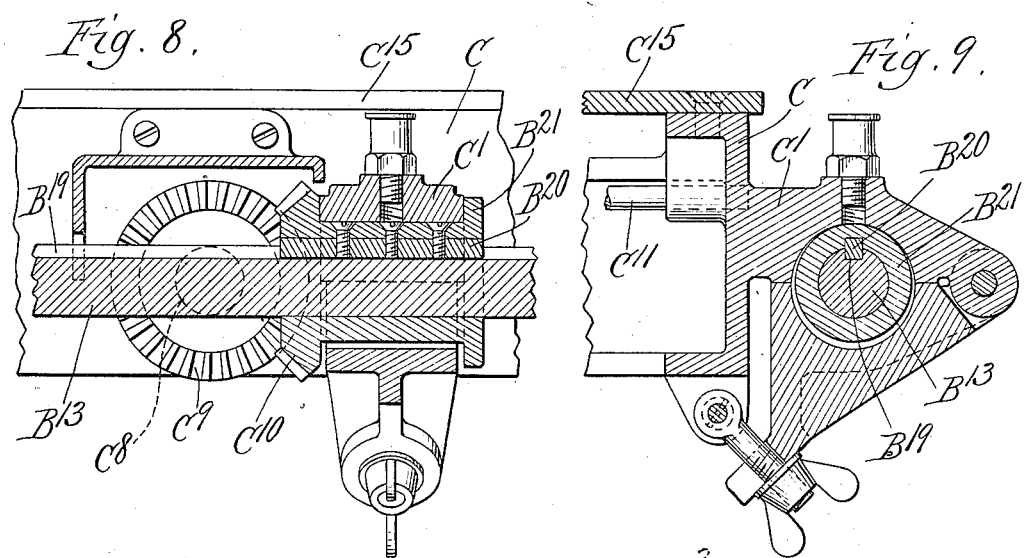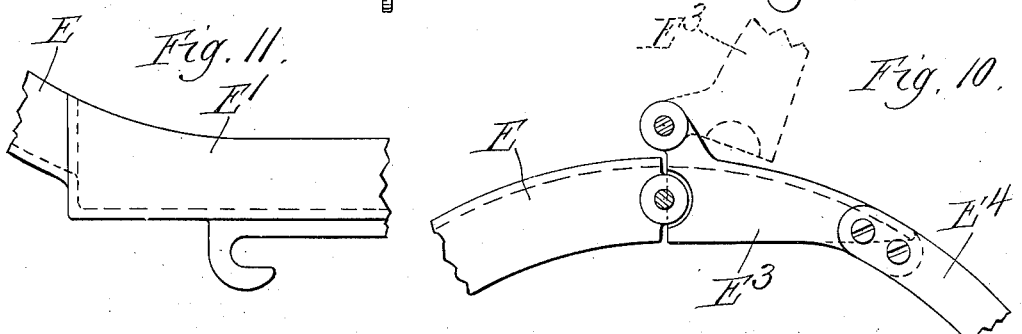

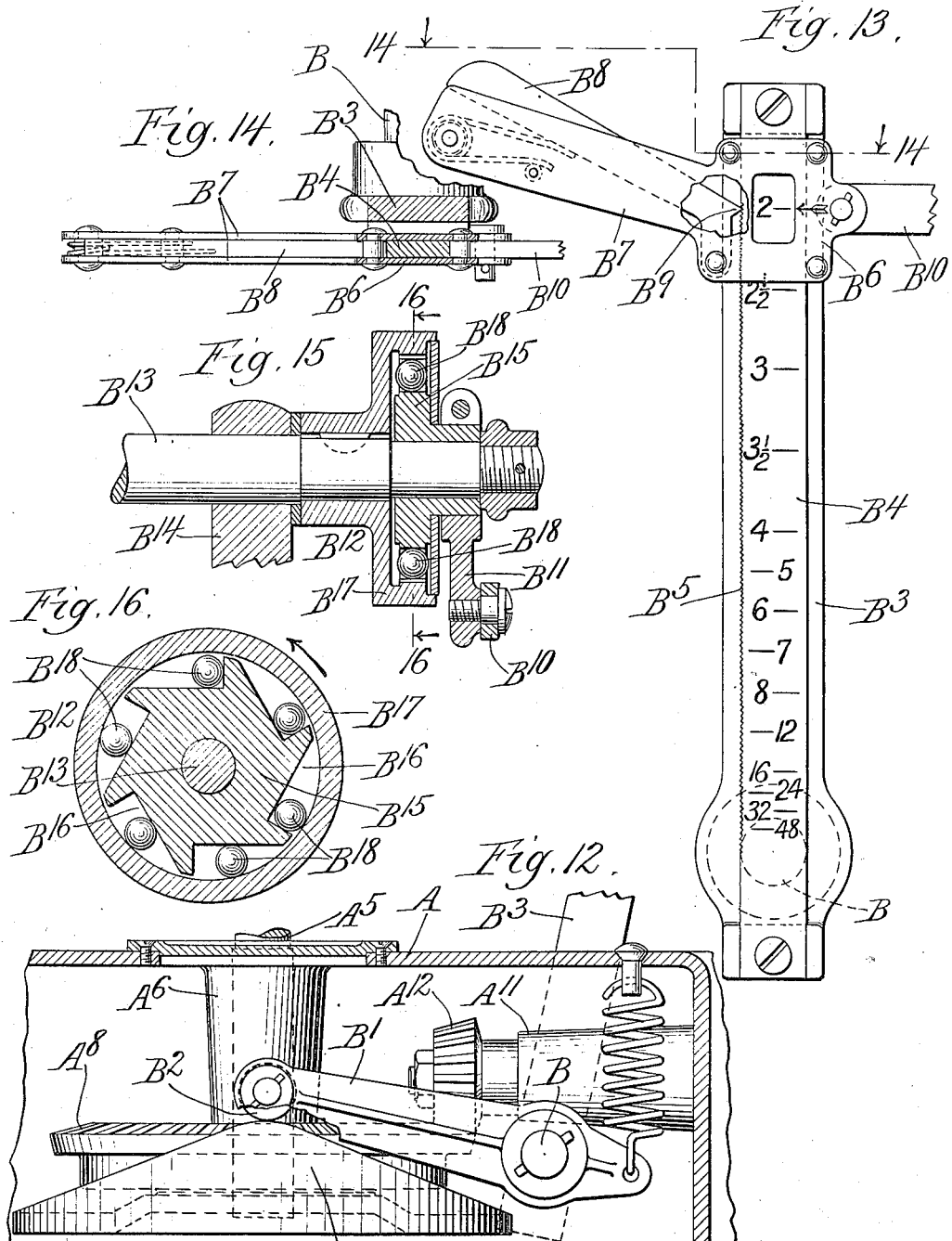

AUGUST R. LUSCHKA, OF CHICAGO, ILLINOIS, ASSIGNOR TO AMERICAN SLICING MACHINE COMPANY, OF CHICAGO, ILLINOIS, A CORPORATION OF NEW YORK.

SLICING-MACHINE.

1,044,895.   Specification of Letters Patent.   Patented Nov. 19, 1912.

Application filed June 12, 1911. Serial No. 632,540.

*To all whom it may concern:*

Be it known that I, AUGUST R. LUSCHKA, a citizen of the United States, residing at Chicago, in the county of Cook and State of Illinois, have invented a certain new and useful Improvement in Slicing-Machines, of which the following is a specification.

My invention relates to improvements in slicing machines and has for its object to produce a new and improved form thereof.

It is illustrated diagrammatically in the accompanying drawings, wherein,

Figure 1 is a plan view showing the parts in position to commence a cutting stroke; Fig. 2 is an end elevation; Fig. 3 is a front elevation; Fig. 4 is a section through the machine along the line 4—4 and through the carriage along the line $4^a$—$4^a$ of Fig. 1; Fig. 5 is a detail section along the line 5—5 of Fig. 4; Fig. 6 is a plan view of the meat carriage with meat plate and carriage top plate removed; Fig. 7 is a section of the meat carriage along the line 7—7 of Fig. 1; Fig. 8 is a detail section along the line 8—8 of Fig. 1; Fig. 9 is a detail section along the line 9—9 of Fig. 1; Fig. 10 is a detail of hinge portion of knife guard; Fig. 11 is a detail of knife guard; Fig. 12 is a detail section along the line 12—12 of Fig. 1; Fig. 13 is a detail elevation of device for regulating thickness of slices; Fig. 14 is a detail section along the line 14—14 of Fig. 13; Fig. 15 is a detail section along the line 15—15 of Fig. 2. Fig. 16 is a section along the line 16—16 of Fig. 15.

Like characters refer to like parts throughout the several figures.

The base A contains the driving shaft $A^1$ provided at one end with the drive wheel $A^2$ and at the other end with the pinion $A^3$ in opposition to the bevel gear $A^4$ on the vertically disposed crank shaft $A^5$. The crank shaft $A^5$ is rotatably mounted in the bearing sleeve $A^6$, carries at one end the crank $A^7$, at the other end the beveled gears $A^8$ and $A^4$ and cam $A^9$. The sprocket shaft $A^{10}$ is rotatably mounted in the bearing sleeve $A^{11}$ slightly out of perpendicular with the drive shaft $A^1$ and is provided at one end with the gear $A^{12}$ in mesh with the gear $A^8$ and at the other end with the sprocket $A^{13}$. The housing $A^{14}$ which is adjustably mounted on one side of the base A incloses the sprocket $A^{13}$ and carries the internally threaded split sleeve $A^{15}$ in which is adjustably held the screw threaded bearing sleeve $A^{16}$ held in position by the clamping screw $A^{17}$ and inclosed by cover $A^{18}$. The shaft $A^{19}$ is rotatably mounted in the sleeve $A^{16}$, carries the concave, convex knife $A^{20}$ and the sprocket $A^{21}$ which is driven by the chain $A^{22}$ from the sprocket $A^{13}$.

The rock shaft B rotatably mounted in the base A, carries at one end the rocker arm $B^1$ provided with the cam engaging roller $B^2$ in opposition to the cam $A^9$, and at the other end with the lever $B^3$, upon which is mounted the indexed guide $B^4$ having the knurled side $B^5$. The box $B^6$ which is slidably mounted on the guide $B^4$ and is provided with the fixed handle $B^7$ containing the adjustable lever $B^8$ having the tongue $B^9$ in opposition to the knurled side $B^5$, carries pivotally mounted the connecting rod $B^{10}$ to operate the arm $B^{11}$ of the ball ratchet $B^{12}$ on the rotating shaft $B^{13}$ carried by the brackets $B^{14}$ on the base A. The ratchet $B^{12}$ is made up of the spider $B^{15}$ rotatably mounted on the shaft $B^{13}$ driven by the lever $B^{11}$ and provided with the inclined ball races $B^{16}$ between which and the housing $B^{17}$ are located the clutch balls $B^{18}$, the housing $B^{17}$ being keyed to the shaft $B^{13}$. The shaft $B^{13}$ is provided with the slot $B^{19}$ which is engaged by the feather $B^{20}$ on the sleeve $B^{21}$.

The carriage C is provided at one side with the split bearing sleeve $C^1$ loosely engaging the sleeve $B^{21}$ and is carried at the other side by the split adjustable bearing sleeves $C^2$ $C^3$ engaging the guide rod or track $C^4$ which rod is supported in the brackets $C^5$ on the base A. The sleeve $C^3$ is provided with the downwardly extending lug $C^6$ upon which is pivotally mounted one end of the link $C^7$ which is pivotally mounted at the other end on the crank $A^7$. The feed screw $C^8$ is rotatably mounted in the carriage C and is provided at one end with the miter gear $C^9$ in opposition to the miter gear $C^{10}$ carried by the sleeve $B^{21}$. The guide bars or tracks $C^{11}$ are mounted in the carriage C at right angles to the rod $C^4$ and carry the slidably mounted feed plate $C^{12}$, which plate is provided at either side with the bracket arms $C^{13}$ $C^{14}$ which extend upwardly and outwardly through the side of the carriage C on either side of the carriage or cover plate $C^{15}$ which plate extends over the entire top of the carriage. The rocker arm $C^{16}$ which is rotatably mounted in the feed plate $C^{12}$ is provided at one end with the lever $C^{17}$ carrying the feed nut $C^{18}$ in opposition to the feed screw $C^8$ and at the other end is provided with the lever $C^{19}$ in opposition to the fixed lever $C^{20}$ on the feed plate.

The removable meat plate D which is provided on either side with the upstanding flanges $D^1$ in which are mounted the handles $D^2$ is supported by the bracket arms $C^{13}$ $C^{14}$, the arm $C^{13}$ being provided with the fixed pins $D^3$ engaging the perforations $D^4$ in one of the flanges $D^1$, and the arms $C^{14}$ being provided with the pins $D^5$ slidably mounted therein and engaging the perforations $D^6$ in one of the flanges $D^1$. The pins $D^5$ are rigidly mounted upon the arms $D^7$ rotatably mounted upon the feed plate $C^{12}$ and held in operative position by the springs $D^{70}$ on the screws $D^8$ to hold the pins against the flange $D^1$. The meat plate D is provided with the upwardly extending reinforcing panels $D^9$ and contains the upwardly projecting meat engaging spikes or pins $D^{10}$ arranged along its forward edge in opposition to the meat holding bar $D^{11}$ which is mounted upon the upwardly extending toothed arms $D^{12}$ and provided with the pivotally mounted toothed meat engaging member $D^{13}$. The arms $D^{12}$ are rigidly attached to the flanges $D^1$. The bar $D^{11}$ is provided at one end with the fixed tooth engaging member $D^{14}$ and at the other end terminates in the handle $D^{15}$ in which is rotatably mounted the tooth engaging pawl $D^{16}$ actuated by the thumb lever $D^{17}$. The meat engaging pins $D^{18}$ project upwardly from the meat plate D at different parts thereof behind the pins $D^{10}$ to hold the meat in position and prevent its sliding and slipping about on the meat plate.

The semi-circular channel shaped knife guard E, terminating at its lower extremity in the pocket $E^1$ is attached beneath the knife to the base A and above the knife to the bracket $E^2$ projecting upwardly from the sleeve $A^{15}$ and is provided with the extension $E^3$ upon which is pivotally mounted the flat knife guarding strip $E^4$ extending outwardly and downwardly toward the base A, and having the extension $E^5$ parallel with the top of the meat plate and removably attached to the base A near the end farthest removed from the knife. The meat pan $D^6$ is provided with the deflecting edge $E^7$ adjacent to the cutting edge of the knife and is mounted at one end upon the bracket $E^2$ and at the other end upon the holding bracket $E^8$ which is adjustably mounted upon the base A.

It will be evident that while I have shown in my drawings an operative device, still many changes might be made in size, shape and arrangement of the parts without departing materially from the spirit of my invention and I wish therefore, that my drawings be regarded as in a sense diagrammatic.

The use and operation of my device are as follows: In using my device the meat plate is placed in position by bringing the perforations in the flange on one side into opposition with the fixed pins on the arms projecting from the feed plate and then forcing the other side down into position on the arms on the other side of the feed plate in such manner that the spring actuated slidable pins therein engage the flange on the other side to hold it in position. The meat is then placed on the meat plate, the meat clamp is brought down until the toothed meat engaging bar engages the upper side of the meat. The bar is rocked sufficiently to bring the fixed tooth engaging member on one end into opposition to the bar on the adjacent upright, the handle is then brought down compressing the meat between the clamping bar and the meat plate, and the removable tooth engaging ratchet allowed to engage a tooth on the adjacent upright, thus holding the meat in position by means of the teeth on the meat clamp and the pins on the meat plate. The machine is then operated by rotating the drive shaft. This rotates the drive crank and the rotation of the crank causes the meat carriage upon which the meat plate is mounted to reciprocate past the edge of the cutting knife. The rotation of the crank shaft causes the driving sprocket shaft to rotate and thus rotates the knife. The lever projecting through the carriage from the meat plate is grasped, rotating the rocker arm to bring the feed nut out of engagement with the feed screw and the plate is fed forward until the meat has almost reached the knife. The lever is then released and the nut allowed to engage the feed screw. The rotation of the crank rotates the feed cam and this rotation of the feed cam operates through the cam roller and rocker arm to rock the shaft. The rocking of this shaft reciprocates the connecting link which leads to the arm of the ball ratchet and these reciprocations rotate the feed shaft. The amount of rotation of the feed shaft for each revolution of the cam or reciprocation of the carriage is adjusted by varying the distance between the center of rotation of the rock shaft and the slidably mounted box on the rock shaft lever, the box being held in position by the spring actuated toothed arm in engagement with the knurled side of the lever, thus controlling the length of the strokes of the ball ratchet. The rotation of the feed shaft rotates the sleeve feathered thereto and this sleeve in its rotation carries with it the miter gear which is in engagement with and rotates the feed screw. The rotation of the feed screw carries forward the feed plate and feeds the meat to the knife.

It will be observed that one side of the carriage is rigidly mounted on the fixed guide shaft by a bearing sleeve and that the other side of the carriage is mounted loosely upon the rotating sleeve on the rotating guide bar or rail, thus preventing binding which might ensue were the two rails not absolutely parallel, by giving the sleeve on the rotating rail a slight amount of play in its veering on the carriage. The housing which contains the sprocket and sprocket chain and which carries the knife shaft is slidably mounted upon the base in such manner that it may be adjusted in position to take up wear or adjust the tension of the chain. In such slicing machines as this it is customary to arrange the knife in such manner that its axis is not exactly perpendicular to the direction of travel of the carriage, thus only the cutting edge of the knife is brought into contact with the work and in order to prevent undue wear or binding of the chain I have arranged the driving shaft on which the driving sprocket is mounted in such manner that it is parallel with the axis of rotation of the knife. By providing the carriage with sleeve bearings which surround the guide rods, I do away with the possibility of one side of the carriage being lifted off its bearing, which is sometimes the case when a heavy cut is being taken. At the same time I provide against binding as before mentioned by giving one bearing a certain amount of play in the carriage. The use of a ball ratchet instead of a tooth ratchet and the use of an adjustable lever arm permits me to vary the stroke at will, giving any thickness between maximum and minimum, instead as in the case of a tooth ratchet, being limited to thicknesses which are multiples of the number of teeth in the ratchet. By the use of a cam rocker arm and cam roller and lever, I am enabled to provide a shifting mechanism which is at all times in contact with the driving mechanism, thus doing away with the jolt or jar incident to the feed responsive to the reciprocations of the carriage rather than the rotation of the crank shaft, and at the same time I am enabled to easily control the feed since the feeding takes place not only when the carriage is receding from the knife, but also when the carriage approaches the knife, the arrangement being such that all the feed takes place between the time when the meat is out of contact with the knife on its receding stroke and before it comes in contact with the knife on its return stroke. I am enabled therefore, to materially increase the time during which feed may take place and therefore, the velocity of the feed at any one time is materially decreased without decreasing the amount of feed. This is done by so designing the cam that there is a forward rocking motion on the rock shaft from the instant that the meat leaves the knife to the instant that it again contacts the knife. This of course, is impossible in any device in which a lever is struck by an arm projecting from the carriage as it reciprocates.

It will be observed that the arrangement of the feed screw and feed plate on the carriage is such that all the operative mechanism is protected from the meat, and at the same time the meat is protected from the mechanism, and it will not be necessary to employ special oils for the lubrication of the working parts in this device. I provide a knife guard channel-shaped in cross section inclosing one half of the knife, the guard being provided at the bottom with a pocket for the accumulation of meat scraps, the remainder of the knife guard is made of a thin strip pivotally mounted upon the channel shaped guard and extending down over across the front of the knife, sufficient space being left between it and the knife to permit the passage of the slices. This pivotally mounted guard is removably attached to the base at the end farthest removed from the knife.

The meat tray projects from the base of the machine and supports the meat deflector which contacts the knife slightly within the cutting surface and prevents the entrance of meat and grease into the mechanism through the medium of the knife. It will be seen that the arrangement of the feed plate is such that the bearing upon which it slides and the mechanism which slides it is completely hidden and all that is exposed is the supporting brackets or arms, upon which is mounted the meat plate.

I claim:

1. In a slicing machine a reciprocating carriage, a cover plate mounted thereon, a feeding plate beneath and a meat plate above said cover plate said meat plate supported independent of the cover plate.

2. In a slicing machine a reciprocating carriage, a cover plate mounted thereon, a slidable feeding plate beneath and a meat plate above said cover plate said meat plate supported independent of the cover plate.

3. In a slicing machine a reciprocating carriage, a cover plate mounted thereon, a feeding plate beneath and a meat plate above said cover plate, the latter being mounted upon the feeding plate said meat plate supported independent of the cover plate.

4. In a slicing machine a reciprocating carriage, a cover plate mounted thereon, a slidable feeding plate beneath and a meat plate above said cover plate, the latter being mounted upon said feeding plate said meat plate supported independent of the cover plate.

5. In a slicing machine a reciprocating carriage, a cover plate mounted thereon, a feeding plate beneath and a meat plate above said cover plate, the latter being removably mounted upon the feeding plate said meat plate supported independent of the cover plate.

6. In a slicing machine a reciprocating carriage, a cover plate mounted thereon, a slidable feeding plate beneath and a meat plate above said cover plate, the latter being removably mounted upon said feeding plate said meat plate supported independent of the cover plate.

7. In a slicing machine a reciprocating carriage, a feeding plate slidably mounted in said carriage, arms projecting upwardly and outwardly from either side of said plate, a cover plate for said carriage located between said arms and a meat plate mounted upon them said meat plate supported independent of the cover plate.

8. In a slicing machine a reciprocating carriage, a feeding plate slidably mounted in said carriage, arms projecting upwardly and outwardly from either side of said plate, and a meat plate mounted upon said arms said meat plate supported independent of the cover.

9. In a slicing machine a slidably mounted feeding plate, arms projecting upwardly and outwardly from either side of said plate, a meat plate and fixed pins in some of said arms and slidably mounted pins in other arms engaging said meat plate.

10. In a slicing machine a reciprocating carriage, a feeding plate slidably mounted in said carriage, arms projecting upwardly and outwardly from either side of said plate, and a meat plate removably mounted upon said arms said meat plate supported independent of the cover plate.

11. In a slicing machine a slidably mounted feeding plate, arms projecting upwardly and outwardly from either side of said plate, a meat plate and fixed pins in some of said arms and spring actuated slidably mounted pins in the other arms engaging the meat plate.

12. In a slicing machine a reciprocating carriage, a cover therefor and a feeding plate beneath said cover and a meat plate supported independent of the cover plate.

13. In a slicing machine a reciprocating carriage, a feeding plate slidably mounted therein and a centrally disposed feed screw therefor and a meat plate supported independent of the cover plate.

14. In a slicing machine a reciprocating carriage, a feeding plate slidably mounted therein and a centrally disposed feed screw therefor and beneath said feeding plate and a meat plate supported independent of the cover plate.

15. In a slicing machine a reciprocating carriage, a feeding plate slidably mounted therein, a centrally disposed feed screw therefor and beneath said feeding plate, and a cover for said carriage above said feeding plate and a meat plate supported independent of the cover.

16. In a slicing machine a reciprocating carriage, a feeding plate slidably mounted therein, a centrally disposed feed screw beneath said feeding plate and a detachable connection between said plate and said screw and a meat plate supported independent of the cover plate.

17. In a slicing machine a reciprocating carriage, and guide rails therefor, one of them fixed, the other rotatable and means for rotating it.

18. In a slicing machine a reciprocating carriage, a fixed guide rail therefor, a bearing sleeve upon said rail and rigidly mounted upon said carriage and means for rotating it and a meat plate supported independent of the cover plate.

19. In a slicing machine a reciprocating carriage, a fixed guide rail therefor, a bearing sleeve upon said rail and rigidly mounted upon said carriage and a rotatable guide rail supporting one side of said carriage and means for rotating it.

20. In a slicing machine a reciprocating carriage, a fixed guide rail therefor, a bearing sleeve upon said rail and rigidly mounted upon said carriage, a rotatable guide rail and means for rotating it, a sleeve slidably mounted thereon and a loose bearing on said carriage for said sleeve.

21. In a slicing machine a reciprocating carriage, a feeding plate slidably mounted therein and a feeding screw connected with each of them, a rotating feed shaft at right angles to said screw, a gear slidably mounted on said shaft rotating therewith and a pinion in mesh with said gear upon the feeding screw.

22. In a slicing machine a reciprocating carriage, a feeding plate slidably mounted therein, a feed screw connected with each of them and rotating with the shaft at right angles to said screw, a gear slidably mounted on said shaft and rotating therewith, a pinion in mesh with said gear upon said feeding screw, a crank shaft and means responsive thereto for reciprocating the carriage and means responsive to the rotation of said crank shaft for rotating said feed shaft.

23. In a slicing machine a rotating feed shaft, a crank shaft and means directly responsive to the rotation of said crank shaft for intermittently rotating said feed shaft.

24. In a slicing machine a rotating feed shaft, a crank shaft, means directly responsive to the rotation of said crank shaft for intermittently rotating said feed shaft, said means comprising a lever, a cam on the crank shaft in opposition to said lever, a rock shaft carrying said lever and an adjustable lever carried by said rock shaft, a ratchet on the feed shaft and a connection from said adjustable lever to said ratchet.

25. The combination with a slicing machine comprising a reciprocating carriage, a knife, and a feed plate, of a carriage operating crank shaft and rotating means directly responsive to the rotation of said shaft for moving the feed plate with respect to the carriage.

26. The combination with a slicing machine comprising a reciprocating carriage, a knife, and a feed plate, of a carriage operating crank shaft, a cam on said shaft, a rock shaft operating in response to said cam, and means responsive to movement of said rock shaft for operating the feed plate.

27. The combination with a slicing machine comprising a reciprocating carriage, a knife, and a feed plate, of a carriage operating crank shaft, a cam mounted on said crank shaft, a feed screw in said carriage, a rotating feed shaft, a connection therefrom to said screw, a rock shaft actuated by said cam and means responsive to the operation of said rock shaft for rotating the feed shaft.

28. The combination with a slicing machine comprising a reciprocating carriage, a knife, and a feed plate, of a carriage operating crank shaft, a cam mounted on said crank shaft, a feed screw in said carriage, a rotating feed shaft and a connection therefrom to said screw, a rock shaft actuated by said cam and means responsive to the operation of said rock shaft for intermittently rotating said feed shaft.

29. The combination with a slicing machine comprising a reciprocating carriage, a knife, and a feed plate, of a carriage operating crank shaft, a cam mounted on said crank shaft, a feed screw in said carriage, a rotating feed shaft and a connection therefrom to said screw, a rock shaft actuated by said cam and means responsive to the operation of said rock shaft for rotating said feed shaft, said means comprising a ratchet and an adjustable driving lever on such rock shaft.

30. The combination with a slicing machine comprising a reciprocating carriage, a knife, and a feed plate, of a carriage operating crank shaft, a cam mounted on said crank shaft, a feed screw in said carriage, a rotating feed shaft and a connection therefrom to said screw, a rock shaft actuated by said cam and means responsive to the operation of said rock shaft for intermittently rotating said feed shaft, said means comprising a ratchet and an adjustable driving lever on such rock shaft.

31. In a slicing machine a drive shaft, a crank shaft rotated thereby and at right angles thereto, a sprocket shaft at right angles to said crank shaft and slightly out of perpendicular to said drive shaft and a knife mounted on a shaft and rotating about an axis parallel with said sprocket shaft.

32. In a slicing machine a drive shaft, a crank shaft rotated thereby and at right angles thereto, a sprocket shaft at right angles to said crank shaft and slightly out of perpendicular to said drive shaft and a knife mounted on a shaft and rotating about an axis parallel with said sprocket shaft, and sprockets on the knife shaft and the sprocket shaft, a sprocket chain for connecting them, a housing carrying said knife shaft and means for adjusting the position of said housing to vary the distance between said sprockets.

33. In a slicing machine a rotating knife, a shaft upon which said knife is mounted, a bearing sleeve for said shaft, a housing supporting said sleeve, and means for longitudinally adjusting the position of said sleeve in said housing.

34. In a slicing machine a rotating knife, a shaft upon which said knife is mounted, a bearing sleeve for said shaft, a housing supporting said sleeve, and means for longitudinally adjusting the position of said sleeve with respect to said housing, said means comprising a screw thread on said sleeve in opposition to the screw thread on said housing.

35. In a slicing machine a crank shaft, a cam mounted thereon, a rocker arm in opposition to said cam, a rock shaft carrying said rocker arm, a lever carried by said rock shaft, a link actuated by said lever, a feed shaft, a ratchet mounted on said feed shaft and actuated by said link and a meat feeding device actuated by said feed shaft.

36. In a slicing machine a crank shaft, a cam driven thereby, a rock shaft, a rocker arm thereon in opposition to the cam, a feed shaft, means interposed between said rock shaft and said feed shaft for rotating it and a meat feeding device and means interposed between it and the feed shaft for actuating it in response to the rotation of the feed shaft.

37. In a slicing machine a crank shaft, a cam thereon, a rock shaft, a rocker arm upon said rock shaft and in opposition to said cam, a meat feeding device and means actuated by said rock shaft for operating said device.

38. In a slicing machine a driving crank shaft, a meat feeding device and means driven by said driving shaft and directly in response thereto for actuating said meat feeding device.

39. In a slicing machine a driving crank shaft, a reciprocating meat carriage, means carried by said carriage for feeding the meat transversely thereacross and means directly operative in response to said crank shaft and independent of the motion of said carriage for operating said meat feeding means.

AUGUST R. LUSCHKA.

Witnesses:
 FRANCIS W. PARKER, Jr.,
 MINNIE M. LINDENAU.